United States Patent [19]

Strow et al.

[11] Patent Number: 4,582,601
[45] Date of Patent: Apr. 15, 1986

[54] POLYMERIC BASKET FRAME FOR A TRAVELING WATER SCREEN

[75] Inventors: Donald A. Strow, Hales Corners; Mark J. Rozanski, Wauwatosa, both of Wis.

[73] Assignee: Envirex Inc., Waukesha, Wis.

[21] Appl. No.: 594,669

[22] Filed: Mar. 29, 1984

[51] Int. Cl.⁴ .............................................. B01D 25/02
[52] U.S. Cl. .................................... 210/161; 210/232; 210/344; 210/495; 210/499
[58] Field of Search ............... 210/780, 783, 154, 155, 210/160, 161, 232, 339, 344, 400, 401, 495, 499; 137/315, 316; 209/233; 55/483, 492, 502, 511, 524, 525, DIG. 5, DIG. 31

[56] References Cited

U.S. PATENT DOCUMENTS

| | | | |
|---|---|---|---|
| 2,525,516 | 10/1950 | Bergmann et al. | 210/158 |
| 2,804,209 | 8/1957 | Carlton et al. | 210/158 |
| 2,851,162 | 9/1958 | Bleyer | 210/158 |
| 2,899,062 | 8/1959 | Heacock | 210/97 |
| 2,996,189 | 8/1961 | Salterbach | 210/155 |
| 3,093,578 | 6/1963 | Hofmeister | 210/91 |
| 3,802,565 | 4/1974 | Hughes | 210/153 |
| 3,850,804 | 11/1974 | Taylor et al. | 210/155 |
| 3,868,324 | 2/1975 | Taylor et al. | 210/158 |

OTHER PUBLICATIONS

"Rex Traveling Water Screens", Bulletin 316-062R, Copyright 1962, Chain Belt Company, IDM-8/63.
"Rex Industrial Waste and Water Treatment Equipment and Processes", Bulletin 315-13, Copyright 1963, Chain Belt Company, IDM-4-63.
"Rex Water Screening Equipment", Bulletin 316-068, Copyright 1968, Rex Chambelt Inc., 12m, 7/68.
"Rex Water Screening Equipment", Bulletin 316-400R1, Copyright 1982, Envirex, Inc., 6.5m, 5-82.

Primary Examiner—Richard V. Fisher
Assistant Examiner—Wanda L. Millard
Attorney, Agent, or Firm—Laurence J. Crain

[57] ABSTRACT

A basket frame for a traveling water screen includes a pair of hollow parallel lip beams connected together by end plates which are secured to the lip beams by plugs fixed to the ends of the hollow lip beams. The hollow cores of the lip beams are sealed against ingress of water so that the basket frame is buoyant in water. The lip beams are formed of pultruded fiberglass with cross sectional shapes which are provided with complementary curved surfaces so that the adjacent lip beams on adjacent baskets provide a close fitting seal on the vertical run of the basket train and also on the curved section at the bottom of the basket train where the baskets make the turn around the traction wheel.

10 Claims, 11 Drawing Figures

WATER TRAVEL

POLYMERIC BASKET FRAME FOR A TRAVELING WATER SCREEN

BACKGROUND OF THE INVENTION

This invention relates to traveling water screens and particularly to a non-metallic basket frame for a traveling water screen.

Traveling water screens have been used for many years in applications in which it is necessary to screen debris and fish from large volumetric flows of water. A typical application is a power plant which requires a continuous, large volume stream of cooling water. Normally, the water for this purpose is taken from the ocean or from rivers or lakes through an inlet water channel. Debris and fish also enter the channel with the water and must be screened out of the water stream to prevent debris from clogging the condenser tubes and prevent the fish from being killed in large numbers by heat and impingement on the condenser tubes and other parts of the cooling system. The screening operation must present the minimum possible obstruction to the water flow and must preserve, to the extent possible, the life and viability of the fish.

In the past, a typical traveling water screen used coarse mesh wire (9.5 mm). In recent years, the utilities have begun to recognize that a finer wire mesh in the water screen reduces the problems of blockage and constriction of the water flow path by growth of marine organisms that the coarse screen failed to remove. Accordingly, consideration has been directed to a more efficient screen which incorporates fine mesh wire (1.0 mm). However, the fine wire mesh removes far more material from the water than the coarse wire, so the screening mechanism must be operated more frequently or continuously to avoid "blinding" or complete blockage of the screen by debris which would produce a serious headloss condition. The finer the wire is, the greater the cleaning requirements are and the greater the headloss produced by the wire itself.

A traveling water screen provides the means for removing debris and safely removing fish from the incoming water, for preserving the life of the fish, and for cleaning the screen. It includes a wide belt-form structure made up of a large number of elongated rectangular baskets attached at their ends to a pair of chains which are trained around a pair of head sprockets at the top and a pair of traction wheels at the bottom. The sprockets are driven so that the baskets continuously or periodically lift out of the water on the upstream side taking the impinged fish and debris with them. Fish are then gently removed by a low pressure water spray, and the debris is removed by a high pressure water spray. The fish and debris are deposited in separate troughs and the fish are returned to the water source. The baskets descend on the downstream side, pass around the traction wheel and ascend again on the upstream side. In order for the traveling water screen to effectively remove debris and fish from the water stream, it is necessary that the joints between adjacent edges of the baskets, and the joints between the baskets and the frame be kept small to prevent ingress of debris and fish.

Numerous problems have been identified and have existed for many years with respect to the operation and maintenance of traveling water screens. One persistent problem is the loosening of the fasteners that attached the basket to the support chains. The metal structures in a traveling water screen are very heavy and the vibration produced in its operation above the water level is almost entirely undamped. As a consequence, there has been a persistent complaint among operators of traveling water screens that the baskets become loose or actually fall off, and frequent retorquing of the attachment bolts is necessary to prevent this from occurring.

One of the most serious problems of prior art traveling water screen baskets is corrosion. Basket frames are most commonly fabricated of a welded carbon steel construction which produces the most inexpensive basket. However, the carbon steel frame must be carefully cleaned and painted to prevent rapid corrosion and weakening of the basket frame. Even with careful surface preparation and protective coating, and most common cause for basket replacement is corrosion because the protective surface coating becomes scratched and abraded under the severe conditions that it encounters in use. To resolve this problem, some installations have elected to use basket frames formed of stainless steel because of its corrosion resistance. However, stainless steel baskets are extremely expensive, and are subject to corrosion, albeit at a slower rate than carbon steel.

The necessity for periodic maintenance and inspection of the baskets of a traveling water screen is the source of another area in which traveling water screens have long needed improvement. The conventional traveling water screen basket typically weighs about 275 pounds; it is a heavy and awkward burden to carry and attach to the traveling water screen support chains. Four workers are normally required to remove or replace a water screen basket, and the process is fatiguing because of the great weight involved, and the awkward and cramped working space within the intake area of a traveling water screen. The process is difficult and tiring, and therefore the work goes slowly.

A traveling water screen can typically extend 40 feet between the head shaft and the foot shaft, in which case each traveling water screen would require 46 baskets. Removal and replacement of 46 baskets typically takes about two working days, during which time the water screen is out of operation. This increases the burden on the other water screens in the installation and increases the chance that they will become jammed or blocked and also increases the headloss across the other water screens.

A high headloss across the water screen can produce severe mechanical stress on the water screen structures. If the stresses become high enough or the structures have been weakened by corrosion, a failure can occur somewhere in the system which can cause the water screen to jam in one fixed position. This often requires the use of divers to locate and burn out the failed structure and then either replace it under water or dismantle it and take it to the surface for repair. This can be a very lengthy and expensive procedure and is the primary reason why periodic maintenance on the traveling water screen is performed at frequent intervals.

To prevent such failure caused by corrosion weakening of the basket, it would be desirable to form the basket of non-metallic, corrosion resistant material, but this has never been successfully accomplished even though it has been attempted occasionally. One of the most serious reasons for concern about non-metallic baskets is the requirement that the basket lip be extremely rigid and resistant to deflection under the forces exerted by a high headloss. If a high headloss condition exists and the basket deflects under that force, it is possible for debris and fish to pass between the adjacent lips of adjacent baskets which defeats the purpose of the water screen. This deflection can also cause the lip and possibly the end plates to crack or break because of the twisting action at the end of the lips where they attach to the end plates. High deflection can cause the basket frame to interfere with the cross members of the water screen frame. This could cause the screen to jam and possibly necessitate major repairs.

The great weight of the chain and the basket frames in a conventional traveling water screen requires that the head shaft sprocket, the head shaft bearings and associated structures be robust and conservatively engineered to carry the weight and still provide a satisfactory service life at a reasonable cost. A lighter weight basket would make it possible to increase the service life at no increased cost, or to decrease the size of some component parts to provide an equal or better service life at less cost. Reductions in dead weight will also decrease maintenance and down time for major overhaul and repairs.

Since weight of the chain and basket train has such a strong influence on the design and cost of the support apparatus and maintenance, it would be desirable to reduce the weight of the basket train even further than would be accomplished by use of non-metallic materials. In addition, the time required by divers to remove the baskets when that procedure is necessary would be greatly shortened and their fatigue cycle greatly lengthened if it were possible to make the weight of the baskets in water neutral or even buoyant so that they could be easily handled under water by divers.

SUMMARY OF THE INVENTION

Accordingly, it is an object of the invention to provide a non-metallic basket frame for a traveling water screen which has sufficient strength to meet the usual headloss requirements without significant deflection. It is another object of the invention to provide a non-metallic basket for a traveling water screen which is compatible with existing water screen frame structures and component parts so that replacement baskets may be substituted for metallic baskets without modifications to the existing water screen chain and other structure. Yet another object of the invention is to provide a non-metallic basket frame for a traveling water screen which is much lighter in weight than the metallic basket frame and is buoyant in water. A still further object of the invention is to provide a non-metallic basket frame for a traveling water screen which is easily assembled by unskilled personnel and may be disassembled and repaired in the field with only a wrench, and may be easily and securely installed in a traveling water screen.

These and other objects of the invention are attained in a preferred embodiment of a basket frame having a pair of hollow parallel lip beams connected together by end plates which are secured to the lip beams by plugs in the ends of the hollow lip beams. The hollow cores of the lip beams are sealed against flooding with water so that the basket frame is buoyant in water. The lip beams can be made of a pultruded fiberglass with cross sectional shapes which provide exceptional strength, exceeding even that of the lips of a conventional steel basket, and the cross sectional shapes may be provided with complementary curved surfaces so that the adjacent lip beams on adjacent baskets provide a close fitting seal on the vertical run of the basket train and also on the curved section at the bottom of the basket train where the baskets make the turn around the traction wheel.

DESCRIPTION OF THE DRAWINGS

The invention and its many attendant objects and advantages will be better understood by reference to the following preferred embodiment when read in conjunction with the following drawings, wherein.

DESCRIPTION OF THE PREFERRED EMBODIMENT

Figure 1:
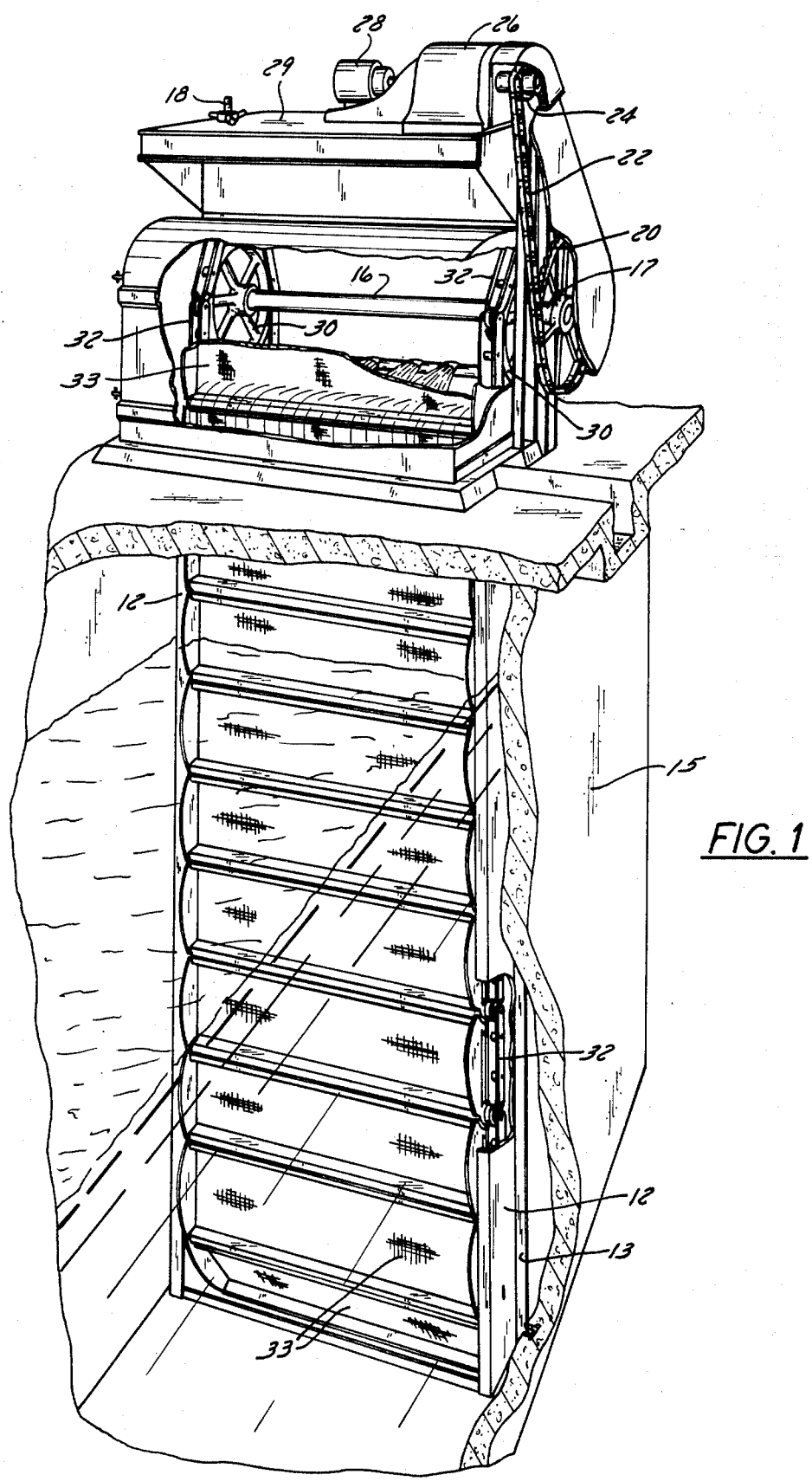
FIG. 1 is a perspective view of a traveling water screen made in accordance with this invention and installed in an inlet water channel.
Figure 2:
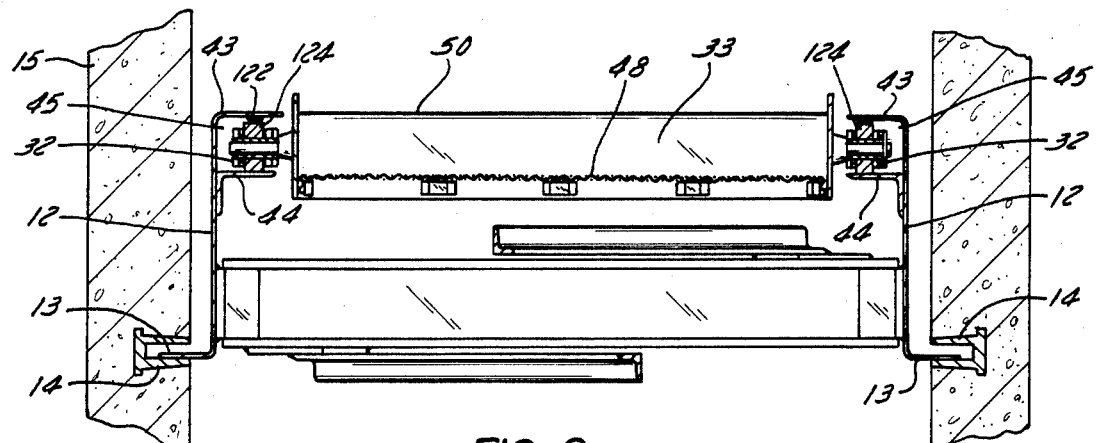
FIG. 2 is a plan view of the upstream side of the traveling water screen shown in FIG. 1.

Referring now to the drawings, wherein like reference characters designate identical or corresponding parts, and more particularly with reference to FIG. 1, a traveling water screen is shown installed in an inlet water channel. The traveling water screen includes an upright frame having a pair of vertical support members 12, each formed in a Z-shaped cross section as shown in FIG. 2. The Z-shaped support members include an outside flange 13 which fits into guides 14 set into the concrete inlet channel walls between which the water screen is placed. Depending on the height of the water screen and the volumetric flow rate through the channel, a second pair of support members (not shown) may be provided on the downstream side of the traveling water screen.

Figure 3:
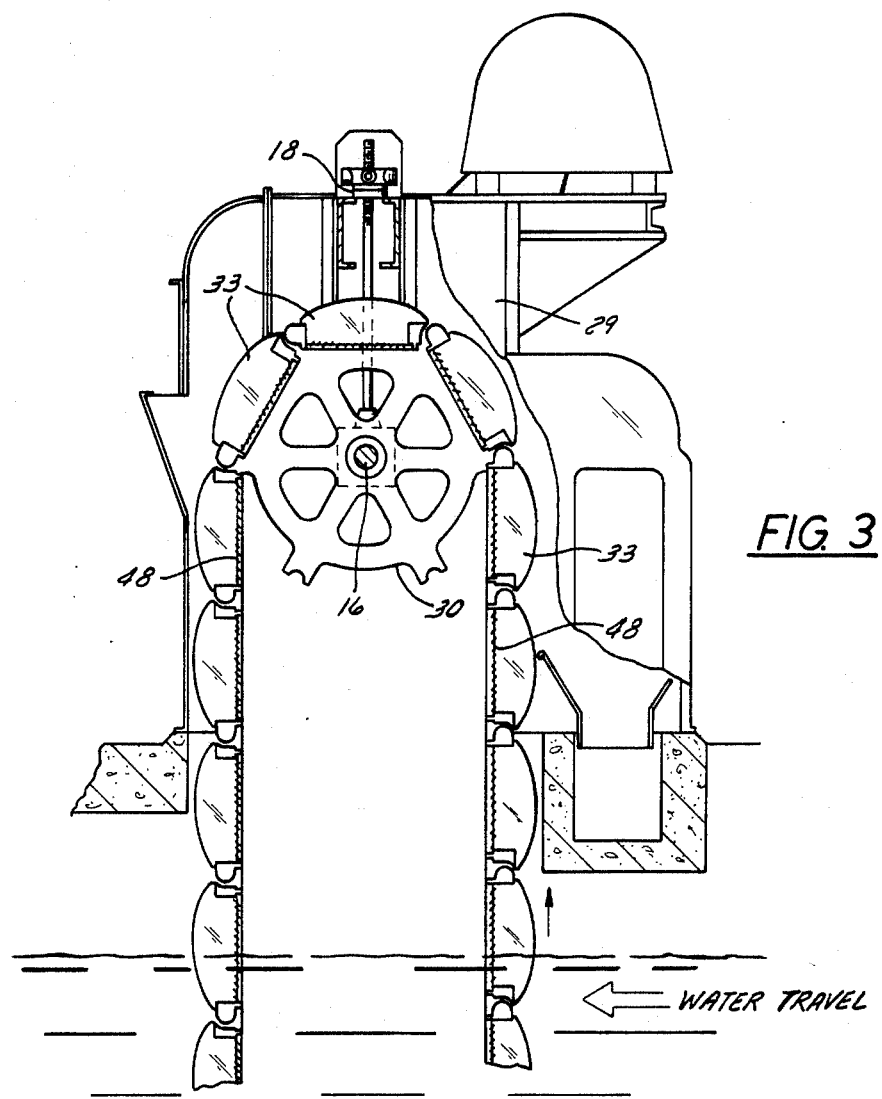
FIG. 3 is a sectional elevation of the head section of the traveling water screen shown in FIG. 1.

A head shaft 16, shown in FIGS. 1 and 3, is mounted in bearings 17 in a take-up mechanism 18 supported on the upper portion or head section of the frame. A large diameter driven sprocket 20 is keyed to the head shaft 16 at one end thereof outside of the head shaft bearings and is driven by a drive chain 22 which is engaged with a drive sprocket 24 mounted on the output end of a gear reducer 26 driven by a motor 28. The motor 28, gear reducer 26 and adjustment wheel of the take-up mechanism 18 are mounted on a support platform 29 which is mounted on the framework of the head section. Two sprockets 30 are mounted on the head shaft just inboard of the head shaft bearings 17. Each sprocket supports and drives a carrying chain 32 which, between them, carry a series of screen baskets 33.

Figure 5:
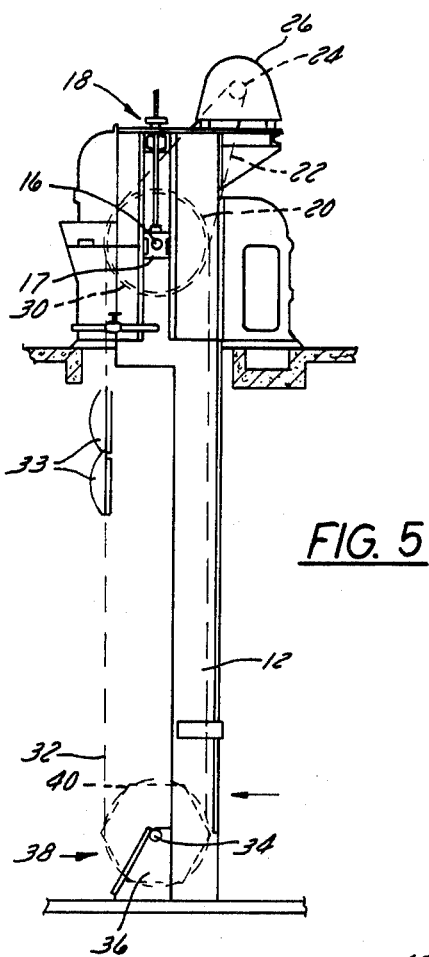
FIG. 5 is a schematic elevation of the water screen shown in FIG. 1.
Figure 4A:
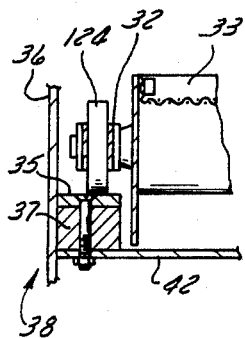
FIG. 4A is a sectional elevation of the boot section 20 shown in FIG. 4, rotated by 90°.
Figure 4:
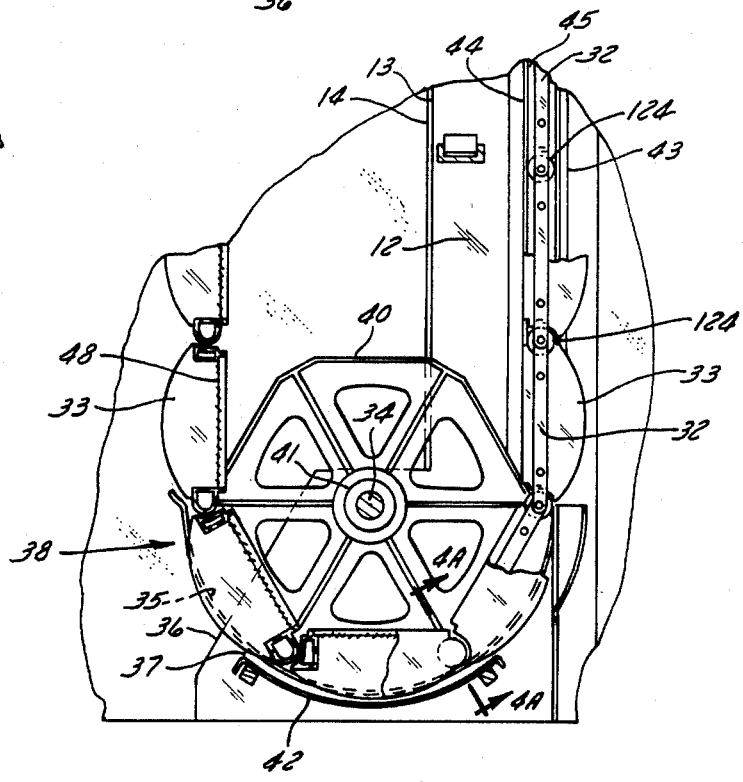
FIG. 4 is a sectional elevation of the boot section of the traveling water screen shown in FIG. 1.

A foot shaft 34, best shown in FIGS. 4, 4A and 5, is mounted on fixed brackets 36 bolted to a boot section 38 of the frame. Two hexagonal traction wheels 40 are mounted on sleeve bearings 41 longitudinally spaced apart, just inside the brackets 36 on the foot shaft 34. A curved track 35 for the chain rollers is bolted to the brackets 36 on each side of the frame to guide the chain through the boot section 38. A filler bar 37 is mounted beneath the curved track 35, and a curved boot plate 42 is mounted on the filler bars 37 on each side of the frame and extends fully across the boot section 38 of the frame. The curved boot plate 42 cooperates with the baskets 33, in a manner to be described below, to provide a seal against ingress of fish and debris between the frame and the baskets at the lower end of the traveling water screen.

A train of longitudinally elongated rectangular baskets 33 connected in closely spaced edge-to-edge relationship to the support chains 32 on each longitudinal side of the traveling water screen forms a continuous screen area to screen out fish and debris from the incoming flow of water. The baskets cooperate with each other and with the frame to provide a seal against ingress of fish or debris at their adjacent edges and at their ends adjacent the channel supports 12. As shown in FIG. 2, the upstream edge of each support member 12 is bent inward to form a flange 43. An angle iron guide rail 44 is welded to the inside face of the support members lying parallel to the flange 43 and spaced downstream from it to form a guide channel 45 within which the carrying chain 32 runs. The flange 43 cooperates with the basket 33 to form a labyrinth seal for exclusion of fish and debris, and the angle iron guide rail 44 provides a support along which the rollers of the chain 32 roll as the chain ascends to support the chain and attached baskets against the hydraulic force of the water flowing through the water screen.

Figure 6:
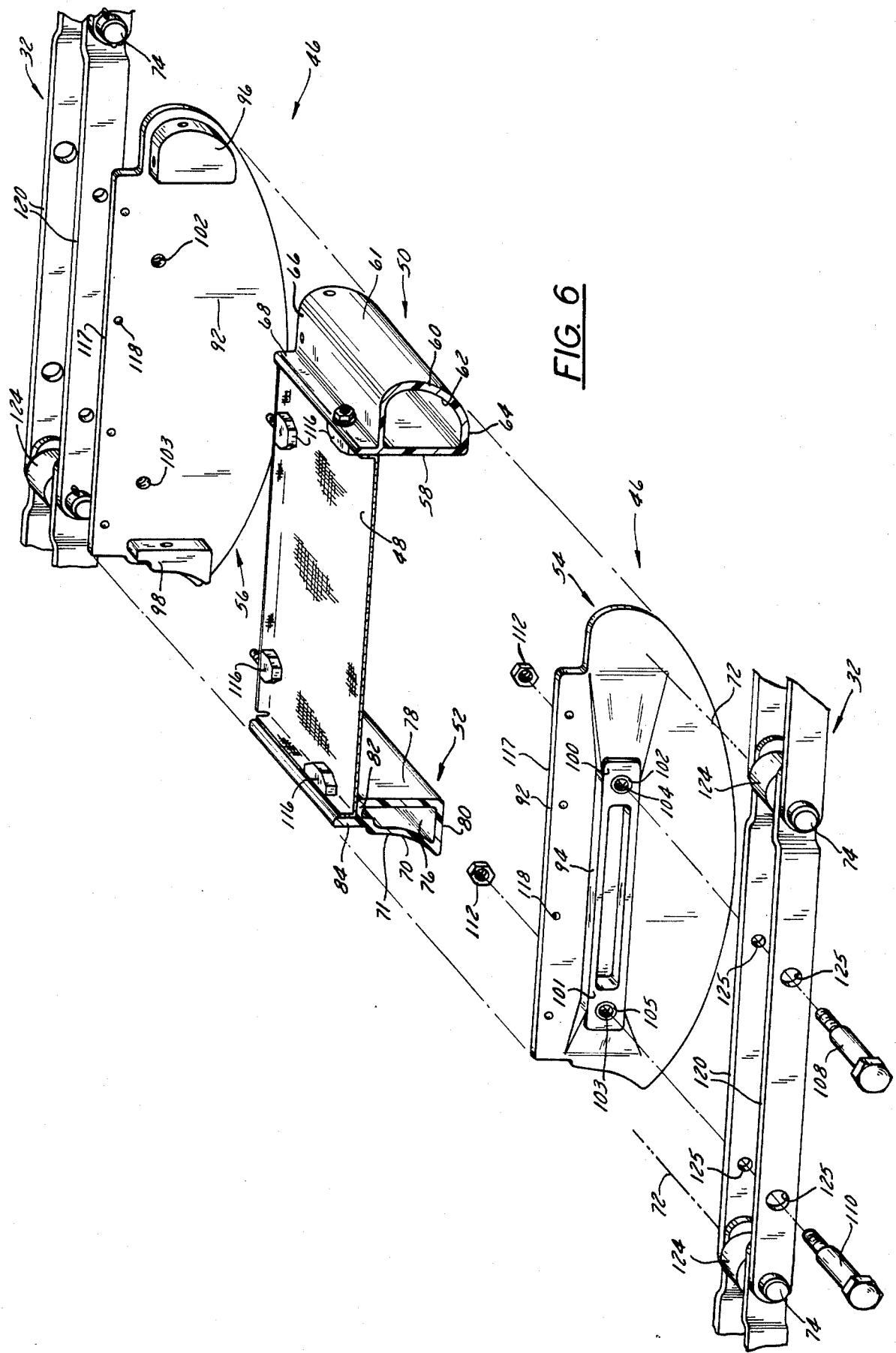
FIG. 6 is a perspective view, partially in section and partially broken away, of a basket for the traveling water screen shown in FIG. 1.

The baskets 33, best shown in FIGS. 1 and 6, each include a basket frame 46 and a rectangular piece of screening 48 fastened at its marginal edges to the basket frame 46. Each basket frame includes an upper lip beam 50 and a lower lip beam 52. The two lip beams 50 and 52 are attached at their ends to two end plates 54 and 56 which hold the lip beams 50 and 52 in spaced parallel relationship and constitute the end members of a rectangular frame.

The lip beams 50 and 52 are formed using the pultrusion process in which a glass fiber roving is passed through a resin bath and is pulled through one or more forming guides which form the resin drenched roving into the desired cross sectional shape. The formed part is then drawn through a heated die, also having the desired cross sectional shape, wherein the resin quickly cures. The part, which emerges as a continuous length, is cut to size. The longitudinal alignment of the fibers in the pultruded lip beams give them exceptional strength against deflection about axes perpendicular to their longitudinal axes.

Figure 7:
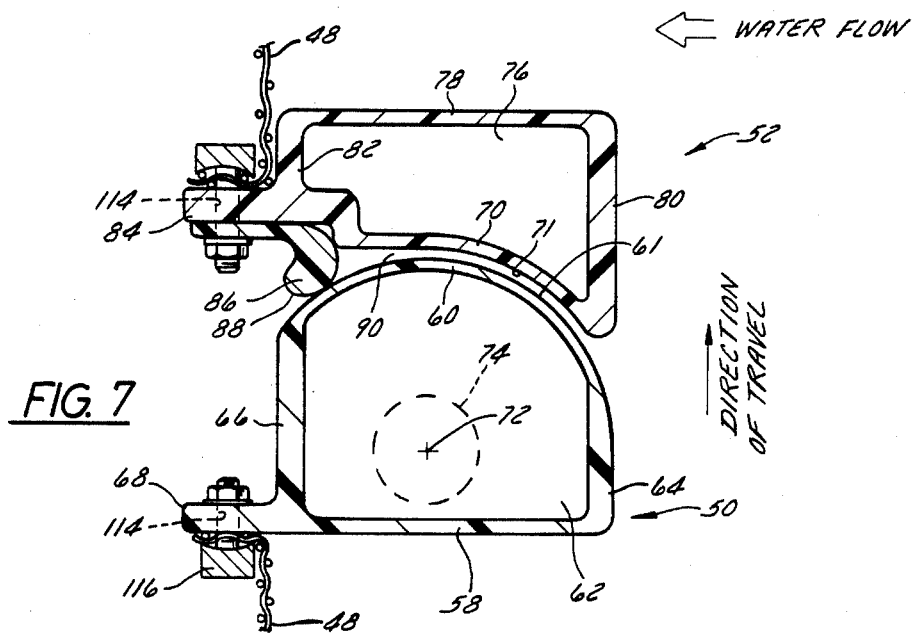
FIG. 7 is a sectional view of the junction between two baskets on the intake water side of the traveling water screen shown in FIG. 1.

The cross sectional shape of the upper lip beam 50, as shown in FIGS. 6 and 7, is generally a hollow D-shape having a flat section 58 with a flat outside surface facing the interior of the frame and having a curved section 60 with an outwardly convex surface 61 facing in the direction that the basket moves around the sprockets and the traction wheels. The upper lip beam 50 has a hollow core 62 whose shape is similar to the outside surface of the D-shaped section of the upper lip beam. As shown most clearly in FIG. 7, however, the wall thickness of the upper lip beam 50 is not uniform but is thicker on the wall section 64 facing upstream and on the wall section 66 facing downstream, that is, in the direction of water flow since those are the directions in which the greatest stresses will be exerted on the lip beam during periods of high headloss.

The flat wall section 58 is extended toward the downstream side of the upper lip beam 50 to form a flange 68 extending perpendicular to the direction of travel of the basket and parallel to the direction of water flow. The flange 68 extends in the direction in which hydraulic force is exerted on the lip beam in periods of high headloss and therefore strengthens the lip beam at a crucial structural region. In addition, the flange 68 is located at a position which enables the screening 48 to be quickly and easily fastened to the basket frame 46. The attachment of the screen to the frame will be described below.

The lower lip beam 52 includes a curved section 70 having an outwardly concave surface 71. The curved section 70 has a slightly larger radius of curvature than the curved section 60 of the upper lip beam 50. The radii of curvature of each lip curved section 60 and 70 are equal to the distance of the surfaces 61 and 71 from the axis of 72 of the most closely adjacent chain pin 74, as explained more fully below.

The lower lip beam 52 has a hollow core 76 bounded by a wall which describes a closed figure. The lower section of the wall is the curved section 70. A flat wall 78 opposite from the curved section 70 forms a lower shelf on the basket on the ascending side of the basket train on the upstream side of the traveling water screen. An upstream wall section 80 of the lower lip beam side wall which faces the upstream side of the traveling water screen is thicker in cross section than the curved section 70 and the flat section 78, and the downstream face 82 of the lower lip beam 52 is likewise made with a thicker wall section to better withstand the forces acting in the direction of water flow through the screen when the water flow becomes blocked and a high headloss condition develops. A flange 84 is formed on the downstream section 82 of the lower lip beam 52 to strengthen the lower lip beam and to provide a mounting flange to which the screening material can be fastened.

A seal 86, shown in FIG. 7, may be fastened to the lower face of the flange 84 and having a flap portion 88 which overlies the gap 90 between the curved wall section 60 of the upper lip beam 50 and the curved wall section 70 of the lower lip beam 52. The gap 90 may be held to a very narrow dimension, for example, on the order of 0.13 inch, and therefore the use of the seal 86 is not necessary in every application. However, the seal prevents the flow of water between the basket lip in which small organisms could pass.

Looking again at FIG. 6, the end plate 54 is a mirror image of the end plate 56, and therefore the following description of the end plates will apply to both end plates and the same reference numerals will be used for each of the structural features in the end plates. The end plate is a unitary fiberglass lamination formed in a transfer mold in which continuous strand fiberglass matting has been laid and compressed, and is held in a matrix of resin injected into the mold. After the part has jelled in the mold, it is removed for curing. The end plate is formed of a plate 92 on which are integrally formed a standoff and stiffening web section 94 and a pair of end plugs 96 and 98. The end plugs 96 and 98 are integrally formed with the end plate by extending the fiberglass mat at the junction of the plate 92 and the plug, and wrapping the mat up along the sides of the plug to provide maximum strength against shearing of the plug from the plate 92. A foam core is placed in the center of the plug 96, or some other technique is employed to make the plug 96 hollow to save the weight and cost of resin in the central portion of the plug which would add little to the strength of the attachment of the plug to the plate.

The cross sectional shape of the plug 96 is selected to closely match the cross sectional shape of the hollow core 62 of the upper lip beam 50 to form a close mechanical fit to help transfer the basket loading to the end plates. The end plug 98 has a cross sectional shape similar to the cross sectional shape of the hollow core 76 of the lower lip beam 52. The plug 98 is formed integrally on the plate 92 in the same manner as the plug 96.

The standoff and stiffening web section 94 includes two bosses 100 and 101 formed integrally as part of the plate 92. The bosses each include a drilled or molded hole 102 and 103 in which is mounted an insert 104 and 105 for receiving a pair of shoulder bolts 108 and 110 by which the chain may be fastened to the end plate. The inserts 104 and 105 may be externally and internally threaded inserts such as the type made by Rexnord Inc. in Torrance, Calif. They are preferably cast-in-place and the external threads hold them securely in the end plate. The bolts 108 and 110 may be securely locked in place by acorn or cap nuts 112 which act as jam nuts and are rounded to shed debris.

The assembly of the basket shown in FIG. 6 is quickly and easily accomplished by relatively unskilled workmen using simple tools. The lip beams 50 and 52 are laid parallel and spaced apart the appropriate distance and the end plates 54 and 56 are placed on the ends of the lip beams with the plugs 96 and 98 fitted into the hollow cores 62 and 76 and sealed therein with an appropriate sealant, if desired. One or more holes is then drilled laterally through both ends of the lip beams 50 and 52 and also through the plugs fitted into the ends thereof. A pin sized to fit with a slight interference fit in the drilled holes is then forced into the holes and the pin is cut off flush with the surface of the lip beams. For security, the pin may be coated with an adhesive before being inserted in the holes for absolute protection against it working loose in use and falling out. The pin is preferably a pultruded fiberglass rod which has exceptional strength and corrosion resistance to correspond to the strength and corrosion resistance of the other members of the basket frame.

After the basket frame has been assembled, a piece of screening 48 having its marginal edges bent 90° is placed in position and holes 114 are drilled in the upstanding flanges 68 and 84 in the upper and lower lip beams 50 and 52 at suitable intervals, typically every nine inches or so. The opening in the screening in alignment with each of the drilled holes 114 in the flanges 68 and 84 is widened with the use of a drift or the like to allow passage of a bolt through the screening 48 and the holes 114. A clamp bar 116 in the form disclosed and claimed in U.S. Pat. No. 4,443,126 issued Apr. 4, 1984 to Donald A. Strow, et al. and entitled "Water Screening Clamp Strip" is utilized to hold the screening to the flanges 68 and 84. Likewise, the end plates 54 and 56 at their top marginal edges 117 as shown in FIG. 6 are provided with holes 118 which receive the bolts of clamp bars 116 and hold the marginal edges of the piece of screening 48 to the end plates in the same manner as used to hold the screening to the lip beams.

The support chain 32 includes two parallel side bars 120 which are offset inward at their trailing edge in the direction of motion and are fastened together at their ends by a bushing 122 which passes through holes at the end of the offset side bars. The chain pin 74 passes through the hollow bushing 122 and through a pair of holes in the next adjacent chain link, and is secured in place to fasten the two chain links together. A roller 124 is disposed on the bushing and provides a low friction surface for guiding the chain along the angle iron guide rails 44 and over the head sprocket. The pitch of the chain, that is, the distance between the center lines of the two chain pins 74, is equal to the vertical height of the basket, which is typically about 24 inches.

A pair of aligned holes 125 are located in the side bars 120, which receive shoulder bolts 108 and 110 to fasten the side bars 120 of the chain 32 spaced apart longitudinally on the chain a distance equal to the distance between the axes of the holes 102 and 103. The bolts 108 and 110 extend through the holes 125 in the side bars and are threaded into the inserts 104 and 105 or secured by nuts on the inside face of the end plate to hold the end plate 92 in place on the chain link of the chain 32. A similar arrangement holds the side bar on the other side of the basket to the other support chain so that the basket is held securely at its two ends to the two support chains. Since the basket is accurately located in a fixed longitudinal position on the chain link and the chain pitch is exactly equal to the vertical height of the basket, it is possible to maintain a very close gap 90 between the baskets. Since the centers of curvature of the convex face 60 of the upper lip beam and the radius of curvature of the concave face 70 of the lower lip beam located at the axis 72 of the chain pin 74, the relative rotation of the adjacent baskets as the basket train passes over the head sprocket 30 or the traction wheel 40 causes a relative rotation about the axis of the chain pin 72 so that the dimension of the gap 90 remains the same; that is, the facing surfaces of the convex section 60 and the concave section 70 of the lip beams remain closely spaced apart and parallel.

Figure 8:
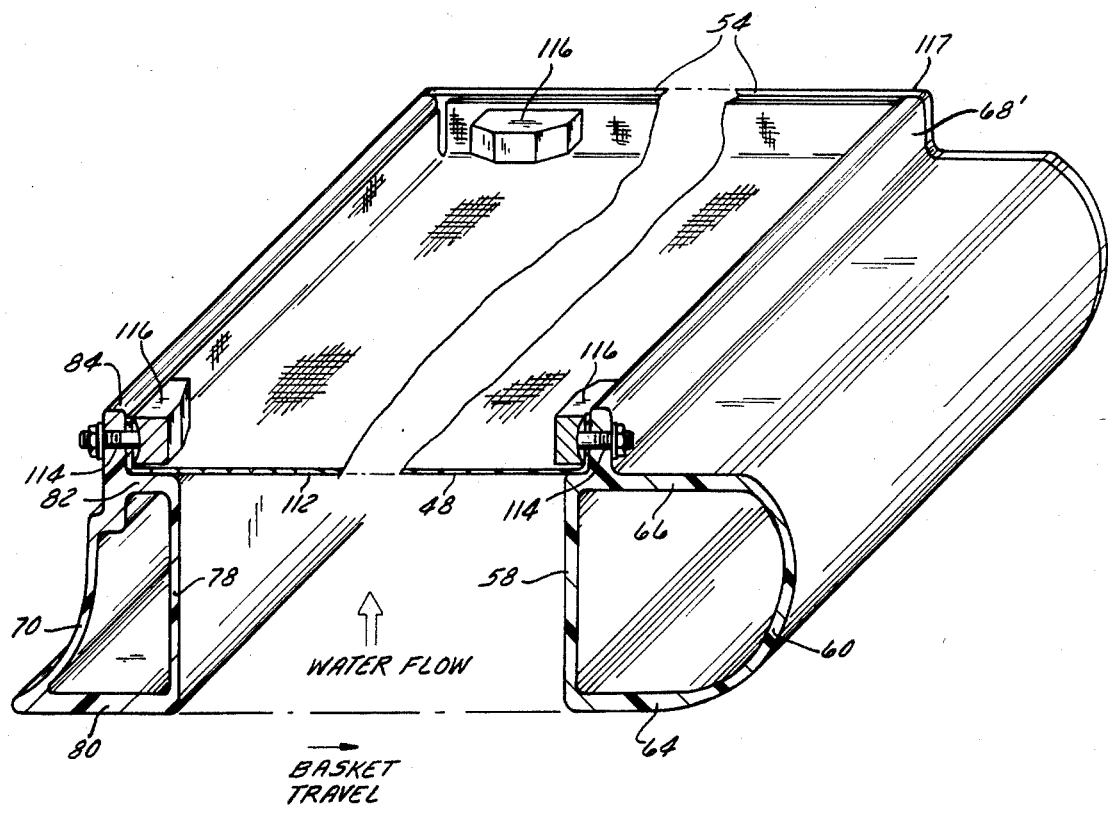
FIG. 8 is a sectional perspective of a second embodiment of an assembled basket frame made in accordance with the invention.

A second embodiment of a traveling water screen basket is shown in FIG. 8, which is structurally identical to the basket shown in FIG. 6 with the sole exception that the flange 68' on the upper lip beam 50 projects from an intermediate position along the downstream wall section 66, and the flange 117 of the end plates 54 and 56 are elongated to reach the flange 68'. This provides a clear region over the entire junction of the screening 48 and the flat surface 59 of the upper lip beam section 58 so there is no obstruction to the cleaning water spray from the downstream side which could provide a sheltered zone to a small clump of debris that would prevent it from being washed off by the water spray and could then float free on the downstream side of the traveling water screen.

Figure 9:
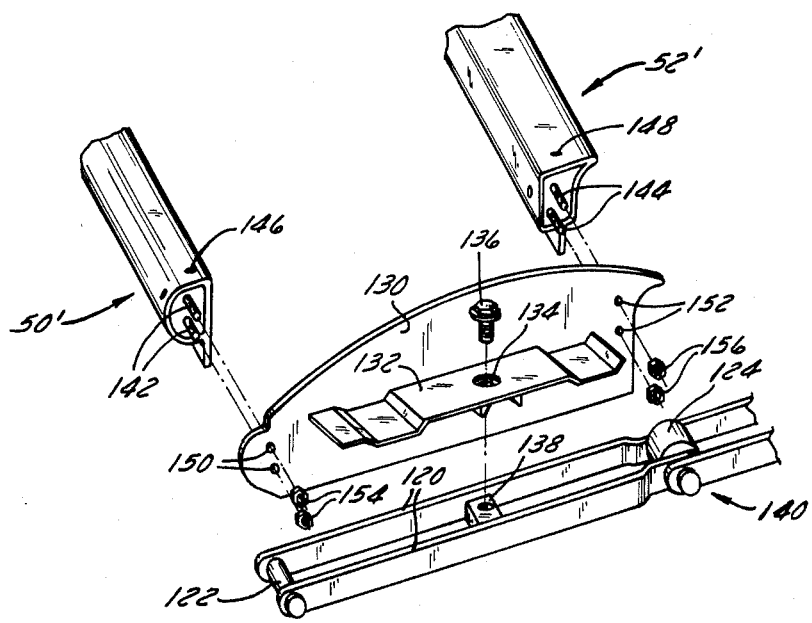
FIGS. 9 and 10 are exploded perspective views of the mounting and end plate attachment arrangements for two alternative embodiments of end plates for the water screen shown in FIG. 1.

Turning now to FIG. 9, a third embodiment of the invention is shown having a steel end plate 130 to which is welded a shelf plate 132 having a single central hole 134 for receiving a screw 136 for fastening the shelf plate and the attached end plate 130 to an attachment pin 138 welded between the side bars of a support chain 140. The end plate 130 is attached to the upper and lower lip beams 50' and 52' by a pair of studs 142 and 144 which extend out of a plug of polymeric material which is cast in the ends of the lip beams 50' and 52'.

The polymeric material is a polyurethane which will adhere securely to the inside walls of the lip beams and seal the beams against ingress of water, or it may be other materials, such as epoxy or polyester which adhere to the inside walls of the lip beams or are secured in place by holes 146 and 148 drilled laterally through the ends of the lip beams 50' and 52', respectively, and which fill the holes 146 and 148 to form buttons or pins which would lock the plug in place in the ends of the lip beams. A set of holes 150 and 152 is drilled or stamped in the ends of the end plate 130 in alignment with the position of the studs 142 and 144, and a nut 154 and 156 is threaded onto the ends of the studs 142 and 144, respectively, to hold the end plate 130 in place on the ends of the lip beams 50' and 52'.

Figure 10:
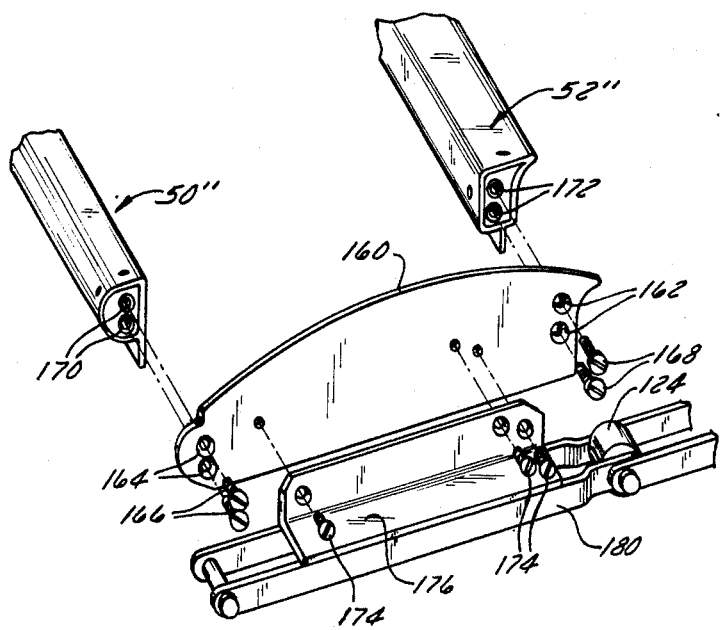

A fourth embodiment, shown in FIG. 10, includes an end plate 160 having two sets of counter sunk holes 162 and 164 in the ends thereof for receiving bolts 166 and 168 for attaching the end plate 160 to the ends of the upper and lower lip beams 50" and 52". The bolts 166 and 168 are threaded into internally threaded inserts 170 and 172 which are embedded in polymer plugs which are cast in the end of the lip beams. The polymer plugs may be the same material as that cast in the ends of the lip beams in FIG. 9 and may be secured in position in the same manner. The end plates 160 are secured to the chain by a set of bolts 174 which fasten the end plate to an L-shaped bracket 176 which is welded to the edges of the two chain side bars of the chain 180.

The attachment structure for attaching the end plates 130 to the lip beams 50' and 52' may also be used for attaching the end plate 160 to the lip beams 50" and 52". The only constraint is that the projecting studs 142 and 144 not project far enough to interfere with the carrier chain.

The plugs 96 and 98 of the embodiment in FIG. 6 and the cast-in-place plugs of the embodiments shown in FIGS. 9 and 10 can be recessed to provide a shoulder around which a sealant may be applied to seal the ends of the hollow cores of the lip beams and prevent ingress of water into the core so that the lip beams provide sufficient buoyancy that the basket frame will float in water. Further insurance against flooding of the core of the lip beams may be obtained by injecting a foam-in-place material which will foam in the core of the lip beams and provide a solid interior core of closed cell foam which will prevent the flooding of the lip beam core. Alternatively, the closed cell foam could be injected in a small portion just inboard of the plugs so that the foam would act as a seal to the plugs but would not actually fill the entire length of the core. Still another structure for preventing the flooding of the lip beam core is to insert a foam preform into the core before the plugs are inserted or cast-in-place.

The traveling water screen basket disclosed herein exhibits remarkable strength and resistance to deflection under high headloss conditions. This allows a closer tolerance between adjacent baskets to be maintained because there is less danger of deflection or twisting causing interference or widening of the gap between adjacent baskets. Accordingly, less debris passes through the gap between the baskets and less debris becomes entrained in that gap.

The non-metalic basket is approximately one-third the weight of a conventional steel basket and greatly reduces the overall weight of the basket train hanging on the head sprockets. This reduces the lubrication requirements for the chain and the head shaft bearing. The lighter basket is much easier to handle during assembly of the basket frame itself and also during assembly of the baskets to the traveling water screen.

The configuration of the lower lip is such that the removal spray is extremely effective in removing debris which is carried by the lower lip to reduce the carry-over of debris to the downstream side of the traveling water screen. The corrosion resistant material increases the service interval of the traveling water screen and, since the basket frames last longer than steel frames, reduces the cost of replacing baskets. It also eliminates that need for surface preparation and coating of the basket frames. The buoyancy of the basket makes the underwater repairs of the baskets and the traveling water screen by divers much easier.

Another important advantage to the non-metalic basket of this invention is that the basket may be repaired in the field. If damage should occur to one of the lip beams or end plates, the basket can be quickly removed from the carrying chains and a new part can be bolted on in place of the damaged part. The repair is very quick and easy and requires nothing more than a wrench.

Obviously, numerous modifications and variations of the preferred embodiment will occur to those skilled in the art in light of this disclosure. Accordingly, these modifications and variations, and the equivalents thereof, may be practiced while remaining within the spirit and scope of the invention as defined by the following claims.

What is claimed is:

1. A polymeric basket frame for attachment to a pair of support chains in a traveling water screen, comprising:
    a lower lip beam having a hollow core bounded by a wall with a cross section describing a closed figure, and extending transversely to the direction of motion of the water screen frame in said traveling water screen;
    an upper lip beam having a hollow core bounded by a wall with a cross section describing a closed figure, and extending parallel to said lower lip beam;
    two end plates, one each on each lateral side of said basket having sealing means connecting said lower lip beam to said upper lip beam at the ends thereof to make up a rectangular frame;
    said upper lip beam having a D-shaped cross sectional shape, an outwardly convex portion of which faces vertically when mounted in said traveling water screen; and
    said lower lip beam having an inwardly bowed cross sectional figure, an outwardly concave portion of which has about the same radius of curvature as said outwardly convex portion of said upper lip beam, said outwardly concave portion of said lower lip beam of one basket facing said outwardly convex portion of said upper lip beam of the next adjacent basket when said baskets are mounted in a traveling water screen, and vertically spaced from said upper lip beam convex surface to provide a gap of less than one-fourth inch thickness to constitute a non-contact, relatively movable seal against ingress of debris and fish on the straight running sections of said traveling water screen and also on the curved sections thereof.

2. The basket frame defined in claim 1, wherein said sealing means includes a plug sealed in each end of each lip beam.

3. The basket frame defined in claim 2, wherein said end plates are fiberglass laminations with said plugs formed integrally thereon.

4. The basket frame defined in claim 3, wherein said plugs are sealed in the ends of said lip beams by a sealant and are pinned therein by pins extending through the wall of said lip beams and through said plugs.

5. The basket frame defined in claim 2, wherein said plugs are cast-in-place curable polymer materials having embedded fasteners for attachment of said end plates.

6. The basket frame defined in claim 1, further comprising an elastomeric seal flap attached to one of said lip beams adjacent to and overlying said gap to seal said gap against ingress of debris and fish.

7. The basket frame defined in claim 1, further comprising a flange projecting from each of said lip beams perpendicular to the direction of motion for attachment of screening to said lip beams.

8. The traveling water screen defined in claim 1 wherein said screening is fabricated from wire having a mesh size on the order of 1.0 mm.

9. A pultruded fiberglass basket frame for a traveling water screen, comprising:

a tubular lower lip beam of pultruded fiberglass having a hollow core and a longitudinal axis extending perpendicular to the direction of motion of said frame in said water screen;

a tubular upper lip beam of pultruded fiberglass having a hollow core and a longitudinal axis parallel to the lower lip axis;

two longitudinally spaced end plates attached to said lip beams and having means for attachment to two longitudinal spaced chains;

means for fixing said end plates at opposite ends thereof to respective axial ends of said upper and lower lip beams, said fixing means including a plug extending into and filling the end of each hollow core of said beams for fixing the position of said end plates tranversely of said beam axes and locking means for preventing axial displacement of said plugs in said beams, and means for fastening said end plates to said plugs, said fixing means designed for ease of on-site replacement of said end plates;

said locking means including pins for axially fixing said plug in said beams, said pins extending through at least two holes located in the tubular wall of said beams;

said plugs are integrally formed of cast-in-place polymer material on the ends of said end plates, and said pins are formed of pultruded fiberglass rods pressed into said beam wall hole and through a hole drilled through said plugs in alignment with said beam wall holes;

said fastening means including a stud imbedded in said plug and having a threaded portion projecting axially therefrom, and said end plate having holes formed in the end portions thereof for receiving said threaded portions, said fastening means further including nuts threaded onto said threaded portions and tightened down firmly against said end plates to hold said end plates in position on the ends of said beams; and said fastening means further including a receptacle imbedded in said plug, said receptacle having an internally threaded bore whose axis is about parallel to the axis of said beams; said end plates having holes formed in the end portions thereof; a plurality of bolts, one each extending through each of said end plate holes and threaded into said threaded receptacles and tightened down against said end plates to hold said end plates in position on the ends of said beams.

10. In a traveling water screen for screening debris and fish from water flowing through an inlet water channel and having an upright frame, horizontally disposed head and foot shaft upon each of which are mounted a pair of sprockets, a pair of longitudinally arranged chains, each of which is trained over one of said head shaft sprockets and one of said foot shaft sprockets, a plurality of horizontally elongated rectangular baskets mounted at their horizontal ends to said chains and having a frame and a rectangular piece of screening attached to all four marginal edges of said frame, and drive means for turning said head shaft, causing said chains to rotate synchronously about said sprockets, wherein the improvement comprises:

each of said basket frames having an upper and lower polymeric tubular lip beam, each of said beams having a hollow core and secured on vertically spaced, mutually parallel axes by a pair of horizontally spaced end plates, said upper lip beam having a cross sectional shape with an outwardly convex portion which faces vertically when mounted in said traveling water screen;

said lower lip beam having a cross sectional shape with an outwardly concave portion which has about the same radius of curvature as said outwardly convex portion of said upper lip beam, said outwardly concave portion of said lower lip beam of one basket facing said outwardly convex portion of said upper lip beam of the next adjacent basket when said baskets are mounted in a traveling water screen, said baskets being mounted on said chains in close, vertically spaced, juxtaposition with said upper lip beam convex surface spaced from said lower lip beam concave surface to provide a gap of less than one-fourth inch thickness to constitute a relatively movable seal against ingress of debris and fish on the straight running sections of said traveling water screen;

said end plates having means thereon cooperating with said frame to seal the ends of said baskets to said frame to prevent ingress of debris and fish;

said frame having a lower end of which is mounted a curved boot plate, said basket end plates and lip beams cooperating with said boot plate to provide a seal between said baskets and said boot plate to prevent ingress of debris and fish;

plug means extending into and filling the end of each hollow core of each of said beams for sealingly fixing the position of said end plates transversely of said beam axes and locking means for preventing the actual displacement of said plugs in said beams, means for fastening said end plates axially to said plugs; and said bracket frames comprising a flange projecting from each of said lip beams perpendicular to the direction of motion for attachment of screening to said lip beams.

* * * * *